United States Patent [19]
Cartwright

[11] Patent Number: 6,098,742
[45] Date of Patent: Aug. 8, 2000

[54] STEERING APPARATUS

[75] Inventor: Mark A. Cartwright, West Lafayette, Ind.

[73] Assignee: TRW Inc., Lyndhurst, Ohio

[21] Appl. No.: 09/211,513

[22] Filed: Dec. 14, 1998

[51] Int. Cl.$^7$ ...................................................... B62D 5/06
[52] U.S. Cl. .......................... 180/435; 180/429; 180/431
[58] Field of Search .................................... 180/417, 429, 180/431, 434, 435, 437

[56] References Cited

U.S. PATENT DOCUMENTS

| | | | |
|---|---|---|---|
| 3,951,045 | 4/1976 | Frei et al. ................................... | 91/467 |
| 4,418,781 | 12/1983 | Rabe et al. . | |
| 4,475,440 | 10/1984 | Rabe et al. . | |
| 4,488,615 | 12/1984 | Millard .................................... | 180/148 |
| 4,646,868 | 3/1987 | Rosell . | |
| 4,815,552 | 3/1989 | James . | |
| 5,251,717 | 10/1993 | Klosterhaus . | |
| 5,505,276 | 4/1996 | Luibrand ................................ | 180/132 |

*Primary Examiner*—Lanna Mai
*Assistant Examiner*—Elaine Gort
*Attorney, Agent, or Firm*—Tarolli, Sunheim, Covell, Tummino & Szabo L.L.P.

[57] ABSTRACT

An apparatus for use in turning steerable vehicle wheels (14, 16) includes first and second pistons (42, 44) which cooperate with a housing (46) to define first and second chambers (38, 40). A rotatable screw member (84) extends from one of the chambers (38) into one of the pistons (84). A valve (22) is connected with the screw member (84) and is operable between an unactuated condition and either one of two actuated conditions directing fluid pressure to the chambers. A steering linkage (18) is connected with the pistons (42, 44) at a location between the pistons. Upon operation of the valve (22) from the unactuated condition to the actuated condition, the pistons (42, 44) move in the chambers (38, 40) and turn the steerable vehicle wheels (14, 16). As the pistons (42, 44) move, a ball nut (86) connected with one of the pistons (42) effects rotation of the screw member (84) to operate the valve (22) toward the unactuated condition.

28 Claims, 5 Drawing Sheets

STEERING APPARATUS

BACKGROUND OF THE INVENTION

The present invention relates to an apparatus for use in turning steerable vehicle wheels.

A known apparatus for use in turning steerable vehicle wheels includes a housing which is connected with a frame of a vehicle. The housing encloses a piston. A hollow piston rod extends from the piston and projects outward from one end of the housing. The piston rod is connected with a vehicle steering linkage. A compensator chamber is provided in the hollow piston rod to enable the working areas on opposite sides of the piston to be equalized. A power steering apparatus having this construction is disclosed in U.S. Pat. Nos. 4,418,781 and 4,475,440.

The aforementioned power steering apparatus includes a piston and cylinder type motor having one end connected to a frame of a vehicle and the opposite end connected with a steering linkage. However, it has been suggested that a central portion of a piston and cylinder type power steering motor could be connected with a vehicle steering linkage. In this apparatus, a pair of pistons cooperate with opposite ends of a housing to form chambers. A connector section disposed between the pistons is connected with a vehicle steering linkage. A steering apparatus having this construction is disclosed in U.S. Pat. Nos. 4,646,868 and 4,815,552.

SUMMARY OF THE INVENTION

The present invention provides an improved apparatus for use in turning steerable vehicle wheels. The apparatus includes first and second pistons which are enclosed by a housing. A rotatable screw member is connected with one of the pistons and effects operation of a power steering valve upon movement of the pistons relative to the housing. A steering linkage may be connected with a connector section which extends between the pistons. Upon movement of the pistons relative to the housing, the steering linkage effects turning movement of steerable vehicle wheels.

BRIEF DESCRIPTION OF THE DRAWINGS

The foregoing and other features of the present invention will become more apparent to one skilled in the art to which the present invention relates upon consideration of the following description of the invention with reference to the accompanying drawings wherein.

DESCRIPTION OF ONE SPECIFIC PREFERRED EMBODIMENT OF THE INVENTION

General Description

Figure 1:
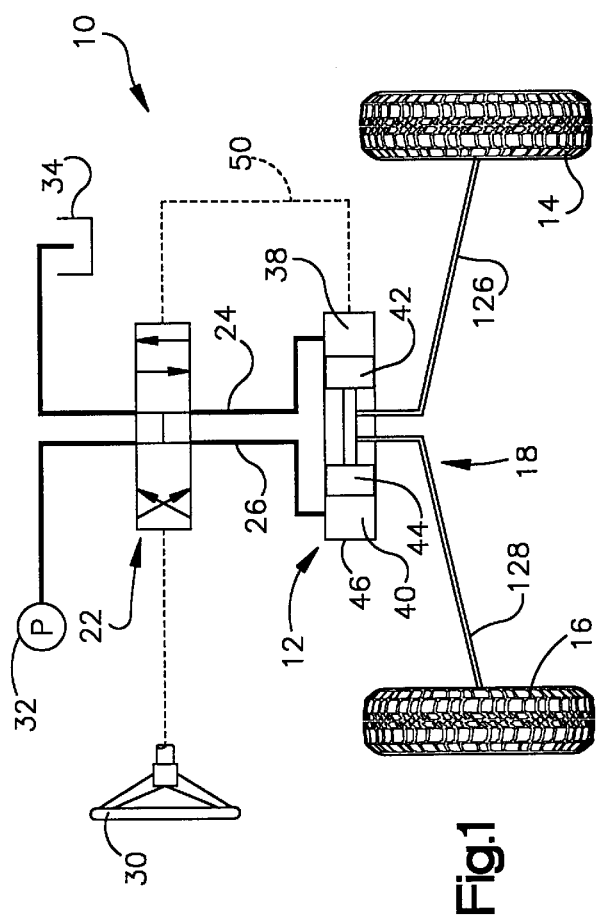
FIG. 1 is a schematic illustration of a steering apparatus constructed in accordance with the present invention to turn steerable vehicle wheels.

A power steering apparatus 10 constructed in accordance with the present invention is illustrated schematically in FIG. 1. The power steering apparatus 10 includes a power steering motor 12 which is connected with steerable vehicle wheels 14 and 16 by a steering linkage 18. A power steering control valve 22 is connected with opposite ends of the power steering motor 12 by conduits 24 and 26. The conduit 24 may be provided as part of the power steering control valve 22 while the conduit 26 is disposed outside the power steering control valve and power steering motor 20. Rotation of a vehicle steering wheel 30 operates the power steering control valve 22 to direct high pressure hydraulic fluid from a pump 32 to one end of the power steering motor 12 and to direct fluid from the opposite end of the power steering motor to a receiver or reservoir 34.

The power steering control valve 22 is of the known open-center type. Therefore, when the power steering control valve 22 is in the unactuated condition illustrated schematically in FIG. 1, opposite ends of the power steering motor 12 are connected in fluid communication with each other and with the pump 32 and reservoir 34.

Upon rotation of the steering wheel 30 in one direction, the power steering control valve 22 is moved toward the right (as viewed in FIG. 1). This results in high pressure fluid from the pump 32 being directed to a first or right chamber 38 of the power steering motor 12. At the same time, a second or left chamber 40 of the power steering motor 12 is connected with the reservoir 34 through the power steering control valve 22.

The high fluid pressure in the first chamber 38 of the power steering motor 12 results in linear movement of first and second pistons 42 and 44 leftward (as viewed in FIG. 1) in a housing 46. As the pistons 42 and 44 move toward the left (as viewed in FIG. 1), the steering linkage 18 is actuated to turn the steerable vehicle wheels 14 and 16, in a known manner, to turn the vehicle in a first direction. As the steerable vehicle wheels are turned, a feedback mechanism 50 is actuated to move the power steering control valve 22 toward its initial or unactuated condition.

Upon rotation of the steering wheel 30 in the opposite direction, the power steering control valve 22 is moved toward the left (as viewed in FIG. 1). Leftward Movement of the power steering control valve 22 results in high pressure fluid from the pump 32 being conducted to the second chamber 40 of the power steering motor 12. At the same time, the first chamber 38 of the power steering motor is connected with the reservoir 34 through the conduit 24. This results in the pistons 42 and 44 being moved toward the right (as viewed in FIG. 1).

As the pistons 42 and 44 move toward the right, the steering linkage 18 turns the steerable vehicle wheels 14 and 16 in a second direction opposite to the direction in which they are turned as the pistons 42 and 44 move toward the left. When the steerable vehicle wheels 14 and 16 have been turned to an extent corresponding to the extent of rotation of the steering wheel 30, the feedback linkage 50 effects operation of the power steering control valve 22 back to the unactuated condition illustrated in FIG. 1.

Figure 2:
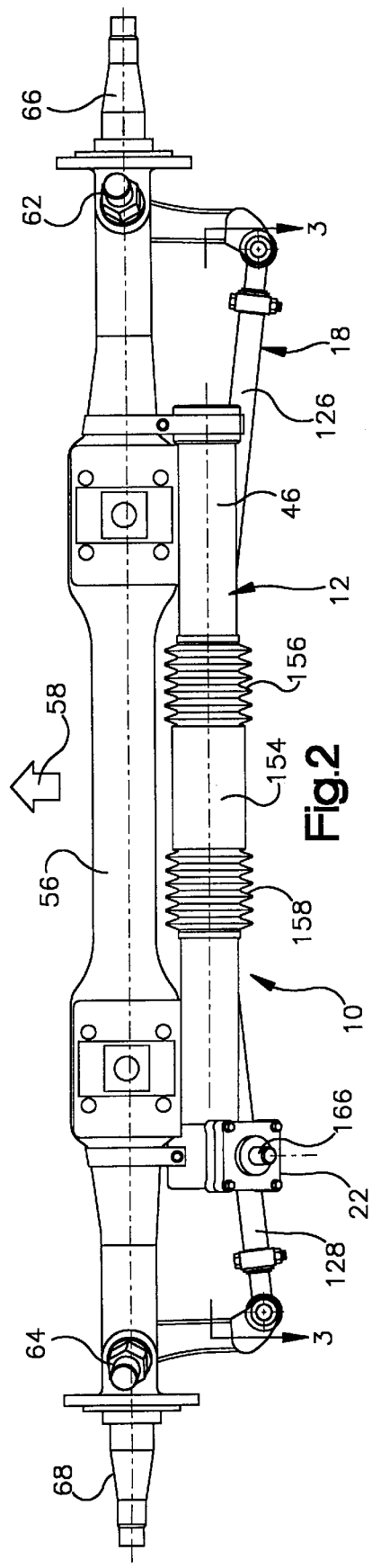
FIG. 2 is a top plan view of one embodiment of the steering apparatus of FIG. 1.

The power steering apparatus 10 is illustrated in FIG. 2 mounted behind a solid front axle 56 of a vehicle. FIG. 2 is a top plan view and the vehicle moves forward in a direction indicated by an arrow 58 in FIG. 2. The power steering motor 12 is connected with steering knuckles 62 and 64 connected with right and left wheel spindles 66 and 68 in a known manner. The housing 46 of the power steering motor 12 is fixedly connected with the front axle 56. It is contemplated that suitable bosses will be provided on a housing for the power steering control valve 22 to enable the power steering control valve to be bolted to the axle 56.

Although the power steering motor 12 has been illustrated in FIG. 2 as being mounted in one specific manner in a vehicle, it is contemplated that the power steering motor could be mounted in a different manner if desired. For example, the power steering motor 12 could be mounted ahead of the front axle 56. Alternatively, the power steering motor 12 could be associated with the rear wheels of the vehicle. The power steering motor 12 may be connected directly with the axle 56 or may be connected to the axle with mounting plates or may be connected to the frame of the vehicle. It should be understood that the power steering apparatus 10 could be used with a vehicle having an independent suspension rather than the solid axle 56 illustrated in FIG. 2.

During operation of the power steering apparatus 10, assist or reaction forces are transmitted from the power steering motor 12 to the front axle 56. These forces are transmitted to the frame of the vehicle through axle mountings. It is contemplated that it may be preferred to use deformable bushings to hold opposite ends of the power steering motor 12 where the housing 46 is connected with the axle 56. The use of deformable bushings would tend to minimize binding of components of the power steering motor 12 during operation of the motor. Of course, the power steering motor 12 may be connected with the axle or another portion of the vehicle in other known ways if desired.

Figure 3:
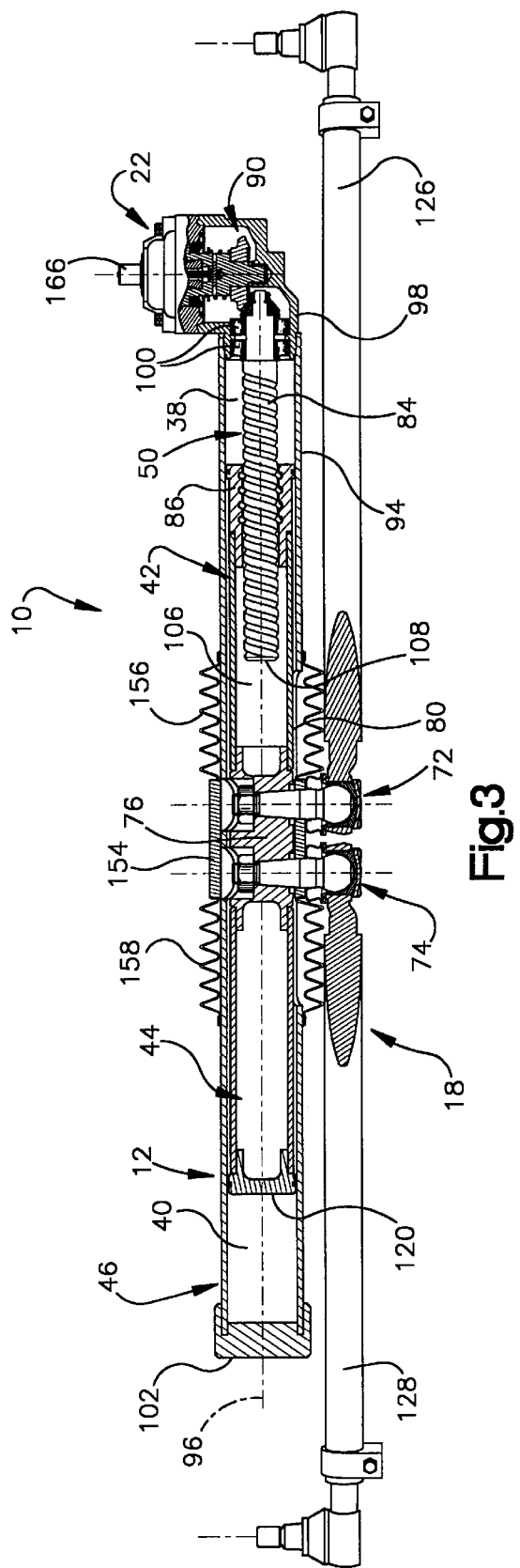
FIG. 3 is an upright sectional view, taken generally along the line 3-3 of FIG. 2, further illustrating the construction of the steering apparatus.

The steering linkage 18 (FIG. 3) is connected with A the power steering motor 12 at a location between the pistons 42 and 44. The steering linkage 18 includes ball joint assemblies 72 and 74 which connect the steering linkage 18 with the power steering motor 12. The ball joint assemblies 72 and 74 are secured to a connector section 76 of the power steering motor 12.

The connector section 76 extends between the first and second pistons 42 and 44. The ball joint assemblies 72 and 74 extend through a linear slot 80, formed in the housing 46, into engagement with the connector section 76. The slot 80 has a length sufficient to enable the ball joint assemblies 72 and 74 to move toward either the left or the right (as viewed in FIG. 3) through a full operating range of the power steering motor 12. The linear slot 80 is disposed in a central portion of the housing 46. The linear slot 80 and ball joint assemblies 72 and 74 block rotation of the pistons 42 and 44 relative to the housing 46.

In the illustrated embodiment of the invention, the feedback mechanism 50 has a screw and nut construction. However, the feedback mechanism 50 could have a different construction if desired. The feedback mechanism 50 includes a rotatable screw member 84 and a nut 86. The nut 86 is fixedly connected with the piston 42. In the illustrated embodiment of the invention, the nut 86 is of the recirculating ball type. Other known types of nuts could be used in place of the recirculating ball type nut 86 if desired.

In addition, the feedback mechanism 50 includes a gear assembly 90 which connects the rotatable screw member 84 with the power steering control valve 22. Although the screw member 84 is rotatable relative to the housing 46, the screw member is held against axial movement relative to the housing. Therefore, upon the application of fluid pressure against either the first piston 42 or the second piston 44, the screw member 84 is rotated relative to the housing 46 by the interaction between the nut 86 and the screw member. This rotational motion is transmitted through the gear assembly 90 to the power steering control valve 22.

Power Steering Motor And Feedback Mechanism

The cylindrical housing 46 (FIG. 3) of the power steering motor 12 holds the cylindrical pistons 42 and 44 in a coaxial relationship. The housing 46 has a cylindrical metal side wall 94. The side wall 94 has a longitudinal central axis 96 which is coincident with longitudinal central axes of the metal pistons 42 and 44 and the metal screw member 84.

Figure 4:
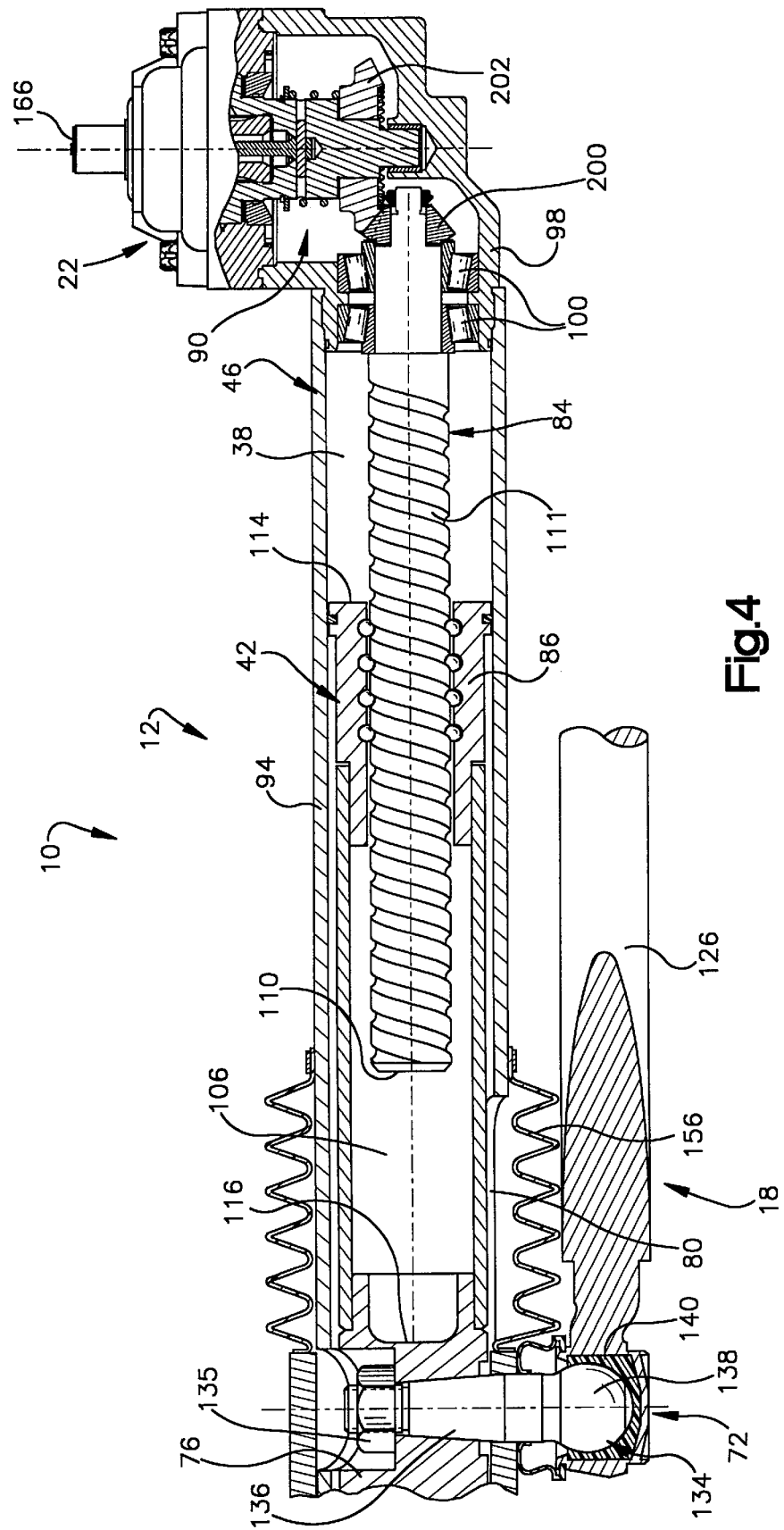
FIG. 4 is an enlarged fragmentary view of a portion of FIG. 3 and illustrating the relationship between a hollow piston, a screw member, and a power steering control valve.

The housing 46 has a right (as viewed in FIGS. 3 and 4) end section 98 with bearings 100 which rotatably support the screw member 84. The end section 98 and bearings 100 retain the screw member 84 against axial movement. The end section 98 cooperates with the side wall 94 and piston 42 to partially form the first chamber 38.

A circular end wall 102 (FIGS. 3 and 5) is connected with the opposite or left end of the side wall 94. The circular end wall 102 cooperates with the cylindrical side wall 94 and piston 44 to form the second chamber 40. The chambers 38 and 40 have central axes which are coincident with the central axis 96 of the housing 46. As was previously mentioned, the chamber 38 may be connected with the power steering control valve 22 by a passage in the end section 98 while the chamber 40 is connected with the power steering control valve by an external conduit.

Upon operation of the power steering control valve 22, the pistons 42 and 44 move together relative to the side wall 94 of the housing 46. Movement of the pistons 42 and 44 varies the volumes of the chambers 38 and 40. This movement of the pistons 42 and 44 operates the steering linkage 18 to turn the steerable vehicle wheels 14 and 16 (FIG. 1).

The rotatable screw member 84 (FIG. 4) extends from the end section 98 of the housing 46 into a generally cylindrical cavity 106 formed in the cylindrical piston 42. The screw member 84 extends axially through the nut 86 connected with the piston 42. The screw member 84, nut 86 and cavity 106 are disposed in a coaxial relationship with each other and with the cylindrical side wall 94 of the housing 46.

Upon movement of the piston 42 relative to the side wall 94 of the housing 46, the telescopic relationship between the screw member 84 and piston 42 varies. This is because the screw member 84 is held against axial movement relative to the housing 46 by the bearings 100. Thus, upon movement of the piston 42 toward the left (as viewed in FIG. 4), the distance which the screw member 84 extends into the cavity 106 is decreased and the telescopic relationship between the screw member and the piston 42 is decreased. Similarly, upon movement of the piston 42 toward the right (as viewed in FIG. 4), the distance which the screw member 84 extends into the cavity 106 increases and the telescopic relationship between the piston 42 and the screw member 84 increases.

During axial movement of the piston 42 relative to the side wall 94 of the housing 46 and screw member 84, spherical balls in the recirculating ball nut 86 cooperate with a helical external thread convolution 111 on the screw member 84 to rotate the screw member relative to the housing 46. This rotation of the screw member 84 is transmitted through the gear assembly 90 to the power steering control valve 22. Upon movement of the piston 42 toward the right (as viewed in FIG. 4), the screw member 84 is rotated in one direction about its longitudinal central axis. Upon movement of the piston 42 toward the left, the screw member 84 is rotated in the opposite direction about its longitudinal axis.

The connection between the helical external thread convolution 111 and the nut 86 is not sealed. Therefore, fluid pressure is transmitted from the chamber 38 along the thread convolution 110 to the cavity 106. This results in the piston 42 having a working area which is equal to the combined area of an annular end surface 114 (FIG. 4) on the piston 42 and the area of a circular end surface 116 of the cavity 106 in the piston 42. The working area on the piston 42 is equal to the circular cross sectional area of the cylindrical piston 42.

The piston 44 (FIG. 5) has a cylindrical configuration and is disposed in a coaxial relationship with the piston 42. The piston 44 has a circular end surface 120 which cooperates with the circular end wall 102 and side wall 94 of the housing 46 to form the second chamber 40 of the power steering motor 12. The second chamber 40 of the power steering motor 12 is cylindrical and is disposed in a coaxial relationship with the first chamber 38 (FIG. 4) of the power steering motor.

Figure 5:
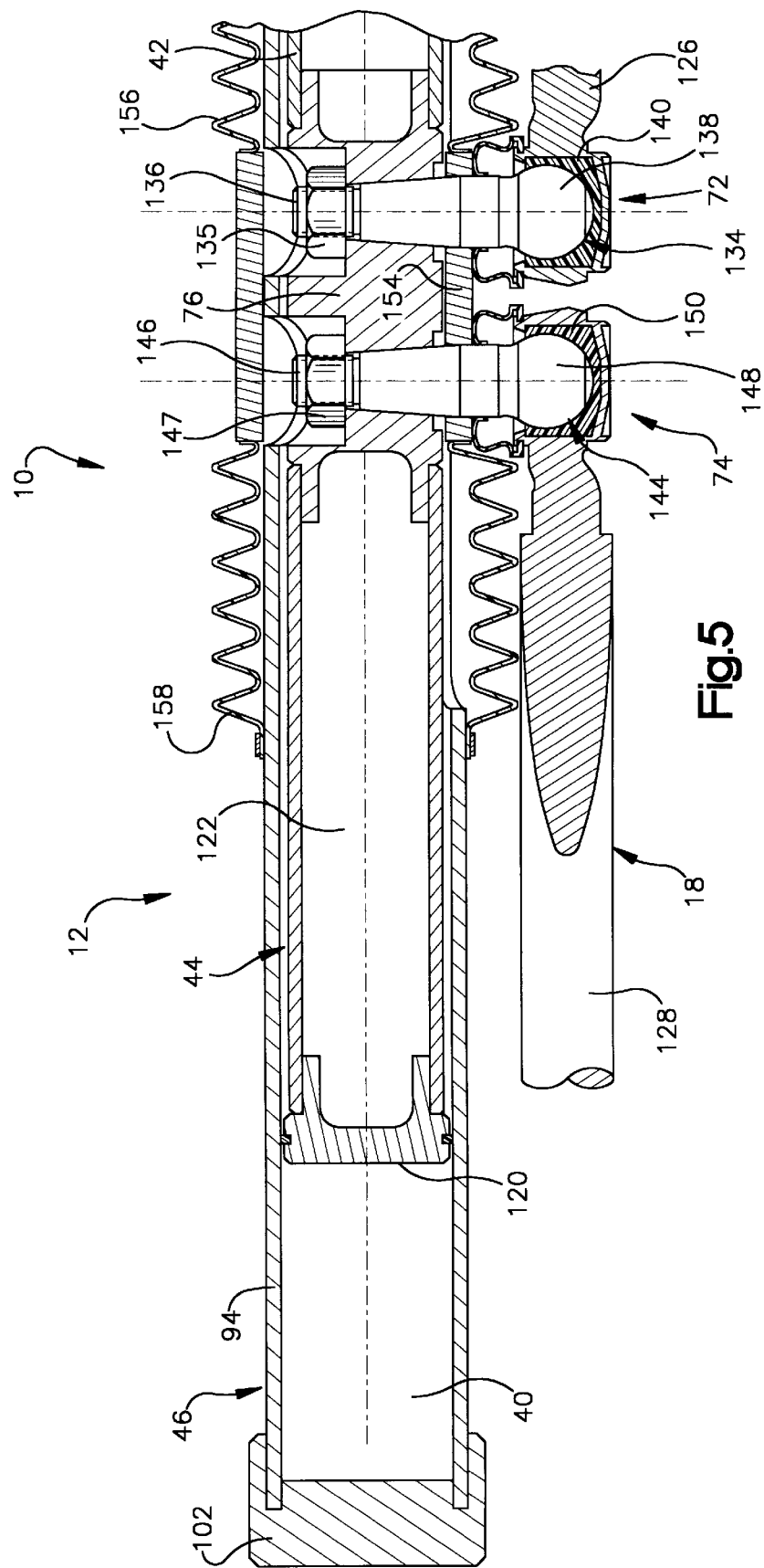
FIG. 5 is an enlarged fragmentary view of a portion of FIG. 3 and illustrating the relationship between a second piston and a connection with a vehicle steering linkage.

In the embodiment of the invention illustrated in FIG. 5, the second piston 44 is hollow. By forming the second piston 44 with a hollow construction, the weight of the power steering motor 12 tends to be minimized. A cylindrical cavity 122 in the piston 44 is sealed. Therefore, fluid pressure can not flow from the chamber 40 into the cavity 122.

The second piston 44 has a working area, that is, the circular end surface 120, which is equal to the working area of the piston 42. Thus, the area of the circular end surface 120 of the piston 44 (FIG. 5) is equal to the working area on the end surface 114 of the piston 42 and the working area on the end wall 116 of the cavity 106. Since the pistons 42 and 44 have equal working areas, the force applied against the piston 42 or 44 by an equal pressure in the chamber 38 or 40 results in the application of equal forces to the steering linkage 18 by the power steering motor 46.

When the steering control valve 22 is actuated to provide a first fluid pressure in the chamber 38, this fluid pressure results in the application of a first force to the steering linkage 18. Similarly, upon operation of the power steering control valve 22 to supply fluid at the first pressure to the second chamber 40, the force transmitted from the piston 44 to the steering linkage is equal in magnitude to the first force. This results in the application of equal power steering assist force to the steering linkage 18 for equal extents of operation of the power steering control valve 22 in either one of two directions.

The ball joint assemblies 72 and 74 (FIG. 5) form part of the steering linkage 18. The ball joint assemblies 72 and 74 extend through the linear slot 80 in the side wall 94 of the housing 46. The ball joint assemblies 72 and 74 are fixedly secured to the connector section 76. The connector section 76 is integrally formed as one piece with the pistons 42 and 44.

Tie rods 126 and 128 (FIG. 3) are connected with the steering knuckles 62 and 64 (FIG. 2). Upon movement of the pistons 42 and 44 (FIG. 3) relative to the housing 46, the ball joint assemblies 72 and 74 move along the linear slot 80 in the housing 46. This results in movement of the wheel spindles 66 and 68 and turning of the steerable vehicle wheels 14 and 16 (FIG. 1).

The ball joint assemblies 72 and 74 (FIG. 3) are connected with the power steering motor 12 at a location midway between the pistons 42 and 44. Thus, the ball joint assembly 72 (FIG. 4) includes a ball stud 134 having a shank portion 136 which extends through an opening formed in the connector section 76. A suitable retainer, such as a nut 135, engages the shank portion 136. A generally spherical head end portion 138 of the ball stud 134 is engaged by a socket assembly 140 connected with the tie rod 126.

The ball joint assembly 74 (FIG. 5) includes a ball stud 144 having the same construction as the ball stud 134 of the ball joint assembly 72. The ball stud 144 includes a shank portion 146 which extends through an opening in the connector section 76. A suitable retainer, such as a nut 147, engages the shank portion 146. A generally spherical head end portion 148 of the ball stud 144 is disposed in a socket assembly 150. The socket assembly 150 is connected with the tie rod 128. Since the ball joint assemblies 72 and 74 are both connected with the connector section 76 disposed between the pistons 42 and 44, bending moments applied to the power steering motor 12 by the steering linkage 18 are minimized.

The ball studs 134 and 144 extend through openings in a cylindrical plate member 154 (FIG. 5) which extends around the side wall 94 of the housing 46. The plate member 154 is axially slidable along the side wall 94 of the housing 46 upon movement of the pistons 42 and 44 in the housing. Flexible boot seals 156 and 158 are connected with the plate member 154 to prevent contaminants from the environment around the power steering motor 12 from entering the housing 46.

Power Steering Control Valve

Figure 6:
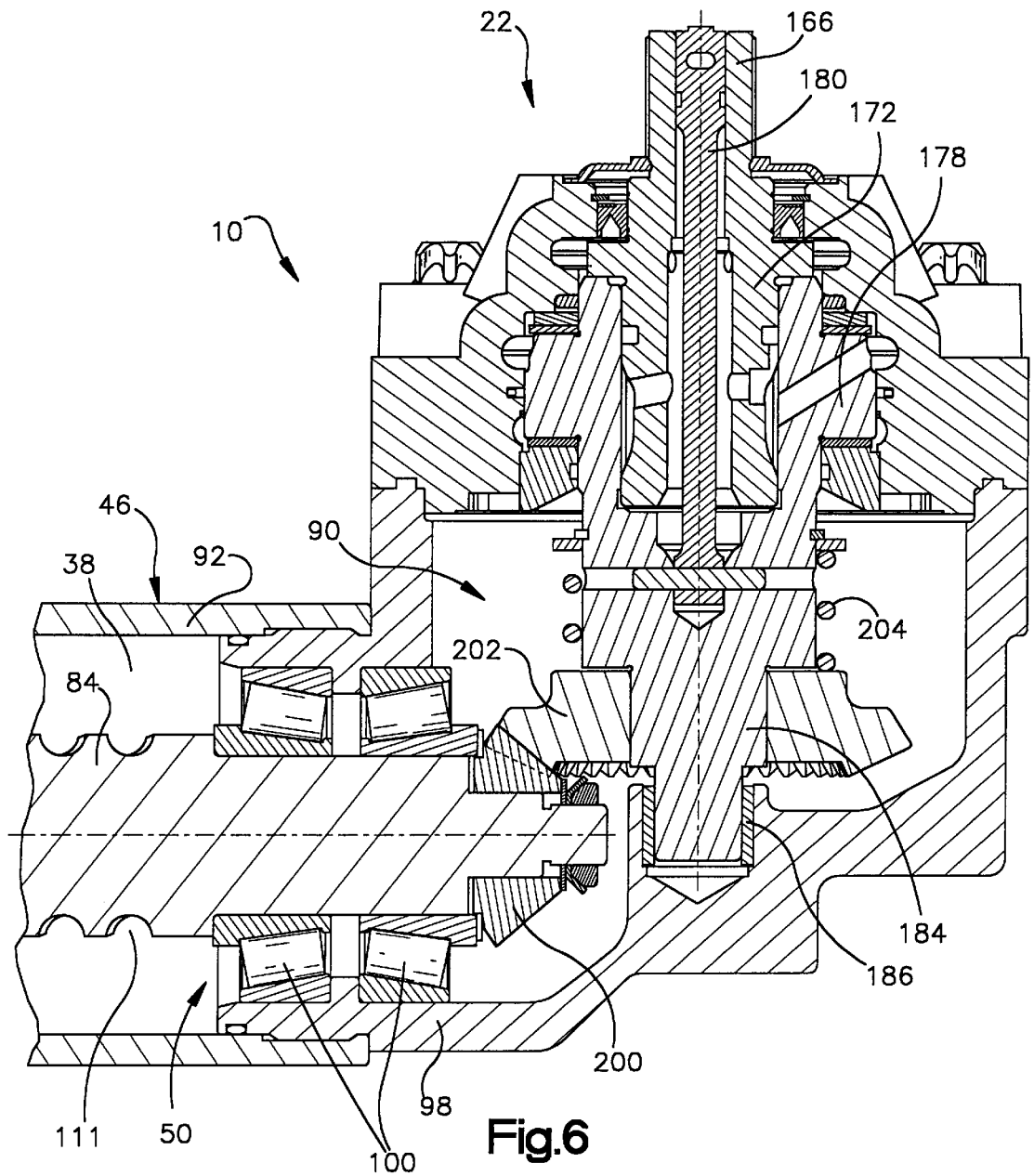
FIG. 6 is a simplified fragmentary sectional view of a steering control valve which is used in the apparatus of FIGS. 2–5.

Although it is contemplated that the power steering control valve 22 could have many different constructions, one specific embodiment of the power steering control valve 22 is illustrated in FIG. 6. The power steering control valve 22 includes a rotatable input member 166 which is connected with the vehicle steering wheel 30 (FIG. 1). An inner valve member or spool 172 is integrally formed as one piece with the input member 166 and is rotatable relative to an outer valve member or sleeve 178. The generally cylindrical valve sleeve 178 is connected with the valve spool 172 by an axially extending torsion bar 180 and a base 184. The base 184 is integrally formed with the valve sleeve 178 and is secured to one end of the torsion bar 180. The base 184 is rotatably supported by a bearing 186.

Upon rotation of the steering wheel 30 (FIG. 1), the input member 166 flexes the torsion bar 180 and rotates the inner valve member 172 through a short arcuate distance relative to the valve sleeve 178. The relative rotation between the inner valve member 172 and the valve sleeve 178 actuates the steering control valve 22. Actuation of the steering control valve 122 is effective to port high pressure fluid to either the chamber 38 or the chamber 40 (FIG. 5) of the power steering motor 12. Once the power steering motor 12 has been operated to an extent corresponding to the extent of rotation of the steering wheel 30 and the input member 166 (FIG. 6), the inner and outer valve members 172 and 178 are returned to their initial or neutral positions by the feedback mechanism 50 to interrupt operation of the power steering motor 12.

The feedback mechanism 50 interconnects the piston 42 and the power steering control valve 22. The feedback mechanism 50 includes the rotatable screw member 84. The screw member 84 is supported for rotation and held against axial movement by the bearings 100 (FIG. 6). The screw member 84 is connected with the gear assembly 90.

The gear assembly 90 includes bevel gears 200 and 202 which transmit rotary motion of the screw member 84 to the outer valve member 178. The outer valve member 178 is rotated relative to the inner valve member 172 to an extent which corresponds to the extent of rotation of the screw member 84. The extent of rotation of the screw member 84 corresponds to the extent of axial movement of the pistons 42 and 44 in the housing 46.

The bevel gear 200 is fixedly connected to the screw member 84 and rotates about the same axis as the screw member. The bevel gear 202 is connected with the outer valve member 178 and rotates about the same axis as the outer valve member. The axes about which the bevel gears 200 and 202 rotate extend perpendicular to each other. If desired, a mechanism other than the gear assembly 90 could be utilized to interconnect the screw member 84 and the power steering control valve 22.

The bevel gear 202 is slidable axially relative to the base 184. This enables a spring 204 to press the bevel gear 202 against the bevel gear 200 and eliminate backlash between the gears 200 and 202. Although the bevel gear 202 is movable axially relative to the base 184, the bevel gear 202 is held against rotation relative to the base by a suitable slot and key arrangement (not shown). If desired, the bevel gear 200 could be urged toward the bevel gear 202 by a suitable spring.

The power steering control valve 22 and gear assembly 90 may have a construction similar to the construction disclosed in U.S. Pat. No. 4,475,440. However, it is contemplated that the power steering control valve 22 could have any one of many different known constructions. For example, the power steering control valve 22 could have a construction similar to the construction illustrated in U.S. Pat. Nos. 4,942,803; 5,361,861; or 5,582,207.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for use in turning steerable vehicle wheels, said apparatus comprising:
   a housing;
   a first piston disposed in said housing and cooperating with said housing to define a first chamber, said first piston having a first working area exposed to fluid pressure in said first chamber;
   a rotatable screw member extending from said first chamber into said first piston; and
   a second piston connected with said first piston and cooperating with said housing to define a second chamber, said second piston having a second working area exposed to fluid pressure in said second chamber.

2. An apparatus as set forth in claim 1 further including a steering linkage connected with said first and second pistons at a location between said first and second pistons.

3. An apparatus as set forth in claim 1 wherein said first piston is at least partially disposed in a first portion of said housing, said second piston is at least partially disposed in a second portion of said housing, said housing includes an intermediate portion which extends between said first and second portions of said housing, said apparatus further includes a connector section which is fixedly connected to and extends between said first and second pistons, said connector section being at least partially disposed in said intermediate portion of said housing, and a steering linkage extending through an opening formed in said intermediate portion of said housing and connected with said connector section.

4. An apparatus as set forth in claim 1 further including a valve connected in fluid communication with said first and second chambers, said valve being operable to a first actuated condition directing high pressure fluid to said first chamber and directing fluid from said second chamber to a receiver, said valve being operable to a second actuated condition directing high pressure fluid to said second chamber and directing fluid from said first chamber to the receiver, said first and second pistons being movable together in a first direction relative to said housing to turn the steerable vehicle wheels in one direction upon operation of said valve to the first actuated condition, said first and second pistons being movable together in a second direction relative to said housing to turn the steerable vehicle wheels in a direction opposite to the one direction, said screw member being rotatable in one direction relative to said first piston during movement of said first piston in the first direction, said screw member being rotatable in a direction opposite to the one direction of rotation of said screw member during movement of said first piston in the second direction.

5. An apparatus as set forth in claim 1 further including a recirculating ball nut connecting said first piston with said screw member.

6. An apparatus as set forth in claim 1 wherein said first and second pistons are movable in a first direction relative to said housing under the influence of fluid pressure in said first chamber to turn the steerable vehicle wheels in one direction and to effect rotation of said screw member in one direction about a longitudinal central axis of said screw member under the influence of force transmitted from said first piston to said screw member, said first and second pistons being movable in a second direction relative to said housing under the influence of fluid pressure in said second chamber to turn the steerable vehicle wheels in a direction opposite to the one direction of turning movement of the steerable vehicle wheels and to effect rotation of said screw member in a direction opposite to the one direction of rotation of said screw member under the influence of force transmitted from said first piston to said screw member.

7. An apparatus as set forth in claim 1 wherein said first piston includes an interior surface which at least partially defines a cavity in said first piston, said screw member extends into said cavity in said first piston, at least a portion of said first working area being disposed in said cavity in said first piston.

8. An apparatus as set forth in claim 7 wherein said screw member and said first piston cooperate to at least partially define a passage along which fluid pressure is conducted between said first chamber and said cavity in said first piston.

9. An apparatus as set forth in claim 7 wherein said first piston is movable in a first direction under the influence of fluid pressure in said first chamber and in said cavity in said first piston to decrease an extent to which said screw member extends into said cavity in said first piston, said first piston being movable in a second direction opposite to the first direction under the influence of fluid pressure in said second chamber to increase the extent to which said screw member extends into said cavity in said first piston.

10. An apparatus as set forth in claim 7 wherein said second piston includes an interior surface which at least partially defines a cavity in said second piston.

11. An apparatus as set forth in claim 7 wherein said second working area is equal to said first working area.

12. An apparatus as set forth in claim 7 further including a recirculating ball nut assembly connected with said first piston, said screw member being disposed in engagement with said recirculating ball nut assembly.

13. An apparatus as set forth in claim 12 wherein said at least a portion of said first working area is disposed on said recirculating ball nut assembly.

14. An apparatus as set forth in claim 13 wherein said second working area is equal to said first working area.

15. An apparatus as set forth in claim 1 further including a connector section extending between said first and second pistons to connect said first and second pistons for movement together relative to said housing, a first ball stud having a first shank portion fixedly secured to said connector section at a location disposed within said housing and a first head end portion disposed outside said housing and connectable with a steering linkage, a second ball stud having a second shank portion fixedly secured to said connector section at a location disposed within said housing and a second head end portion disposed outside said housing and connectable with the steering linkage.

16. An apparatus as set forth in claim 1 further including a valve connected in fluid communication with said first and second chambers, a first gear connected with said screw member and rotatable with said screw member relative to said housing, a second gear connected with said valve and disposed in meshing engagement with said first gear.

17. An apparatus as set forth in claim 16 further including a spring which applies force against one of said first and second gears to urge said one of said first and second gears toward the other of said first and second gears to minimize backlash between said first and second gears.

18. An apparatus as set forth in claim 1 further including a valve assembly connected in fluid communication with said first and second chambers, said valve assembly includes a first rotatable valve member which is connected with a vehicle steering wheel and a second rotatable valve member which cooperates with said first valve member to direct fluid pressure to one of said first and second chambers upon rotation of the vehicle steering wheel and the first valve member, a. first gear connected with said screw member and rotatable with said screw member relative to said housing, a second gear connected with said second valve member and disposed in meshing engagement with said first gear to rotate said second valve member relative to said first valve member upon rotation of said screw member relative to said housing.

19. An apparatus as set forth in claim 18 further including a spring which applies force against one of said first and second gears to urge said one of said first and second gears toward the other of said first and second gears to minimize backlash between said first and second gears.

20. An apparatus for use in turning steerable vehicle wheels, said apparatus comprising:

a housing;

a first piston disposed in said housing and cooperating with said housing to define a first chamber;

a rotatable screw member connected with said first piston;

a second piston connected with said first piston and cooperating with said housing to define a second chamber;

a valve connected with said screw member and operable between an unactuated condition and a first actuated condition directing fluid pressure to said first chamber, said valve being operable between the unactuated condition and a second actuated condition directing fluid pressure to said second chamber;

a connector section extending between said first and second pistons to interconnect said first and second pistons for movement together relative to said housing; and a steering linkage connected with said connector section at a location between said first and second pistons, said steering linkage being actuatable by movement of said first and second pistons relative to said housing to effect turning movement of the steerable vehicle wheels, said screw member being rotatable under the influence of force transmitted from said first piston to effect operation of said valve from one of the actuated conditions to the unactuated condition upon movement of said first and second pistons relative to said housing.

21. An apparatus as set forth in claim 20 wherein said rotatable screw member extends into a cavity in said first piston.

22. An apparatus as set forth in claim 20 further including a gear assembly connected with said rotatable screw member and said valve to transmit rotary motion from said screw member to said valve upon movement of said first and second pistons relative to said housing.

23. An apparatus as set forth in claim 20 wherein said connector section is disposed in said housing and extends between said first and second pistons, said steering linkage extends through an opening in said housing and is connected to said connector section.

24. An apparatus as set forth in claim 20 further including a ball nut assembly disposed in said housing and connected with said first piston, said ball nut assembly being disposed in engagement with said screw member.

25. An apparatus for use in turning steerable vehicle wheels, said apparatus comprising:

a housing;

a first piston disposed in said housing and cooperating with said housing to define a first chamber, said first piston having a first working area exposed to fluid pressure in said first chamber and an interior surface which at least partially defines a cavity in fluid communication with said first chamber, a first portion of said first working area being disposed in said first chamber and a second portion of said first working area being disposed in said cavity;

a rotatable screw member extending from said first chamber into said cavity in said first piston; and;

a second piston connected with said first piston and cooperating with said housing to define a second chamber, said second piston having a second working area exposed to fluid pressure in said second chamber, said second working area being equal to said first working area.

26. The apparatus as set forth in claim 25 wherein said second piston defines a cavity disposed within said second piston.

27. The apparatus as set forth in claim 25 further including a recirculating ball nut connecting said first piston with said screw member.

28. The apparatus as set forth in claim 27 wherein an annular end surface of said ball nut defines a portion of said first working area.

* * * * *